April 2, 1929.  R. JANTZ  1,707,725
LOADING DEVICE
Filed May 28, 1927  6 Sheets-Sheet 5

Inventor
RUDOLPH JANTZ,
By Cushman, Bryant Darby
Attorney

April 2, 1929.　　　　R. JANTZ　　　1,707,725
LOADING DEVICE
Filed May 28, 1927　　6 Sheets-Sheet 6

Patented Apr. 2, 1929.

1,707,725

UNITED STATES PATENT OFFICE.

RUDOLPH JANTZ, OF BOISE, IDAHO.

LOADING DEVICE.

Application filed May 28, 1927. Serial No. 194,996.

This invention relates to loading devices and more especially to improvements in a combined hay gatherer and loader in which the material is automatically collected and delivered to a receptacle as the machine is propelled over the field.

An essential feature of the invention consists in the provision of automatically operable means for insuring an even distribution of the material to a wagon or slip connected to a loading device or the like, while the latter is in operation, and without interrupting or in any way interfering with the progress of the loading device.

A further object is to provide means whereby the collecting and delivering instrumentalities, as well as the wagon are operatively connected to the drive wheels of the machine so that these parts may be simultaneously and selectively actuated during the forward movement of the machine. Additionally, the wagon is so connected to the machine as to permit movement of the latter relative to the former, that is to say, means are provided for causing the wagon as it is being towed by the machine to periodically oscillate while the machine continues to progress thus insuring an even and uniform loading of the material on the wagon.

Another object comprehends the provision of a simple, economical and efficient loading device, in which the various movable and adjustable elements which go to make up the machine may be selectively and independently controlled by means conveniently positioned adjacent the operator's seat.

Other objects and advantages of the invention will become apparent from the following description when taken in conjunction with the accompanying claims.

Referring to the drawings in which is disclosed a preferred embodiment of the invention.

Referring to the drawings, in which like numerals indicate like parts in the various views 10 denotes generally a supporting frame which preferably comprises a pair of bottom side members 11 in the form of skids suitably spaced apart and connected by transverse bars 13 and 14 respectively. Extending from each of the members 11 are a pair of uprights 15 connected by the side bars 16 that may be reinforced by the transverse bars 17.

Figure 2:
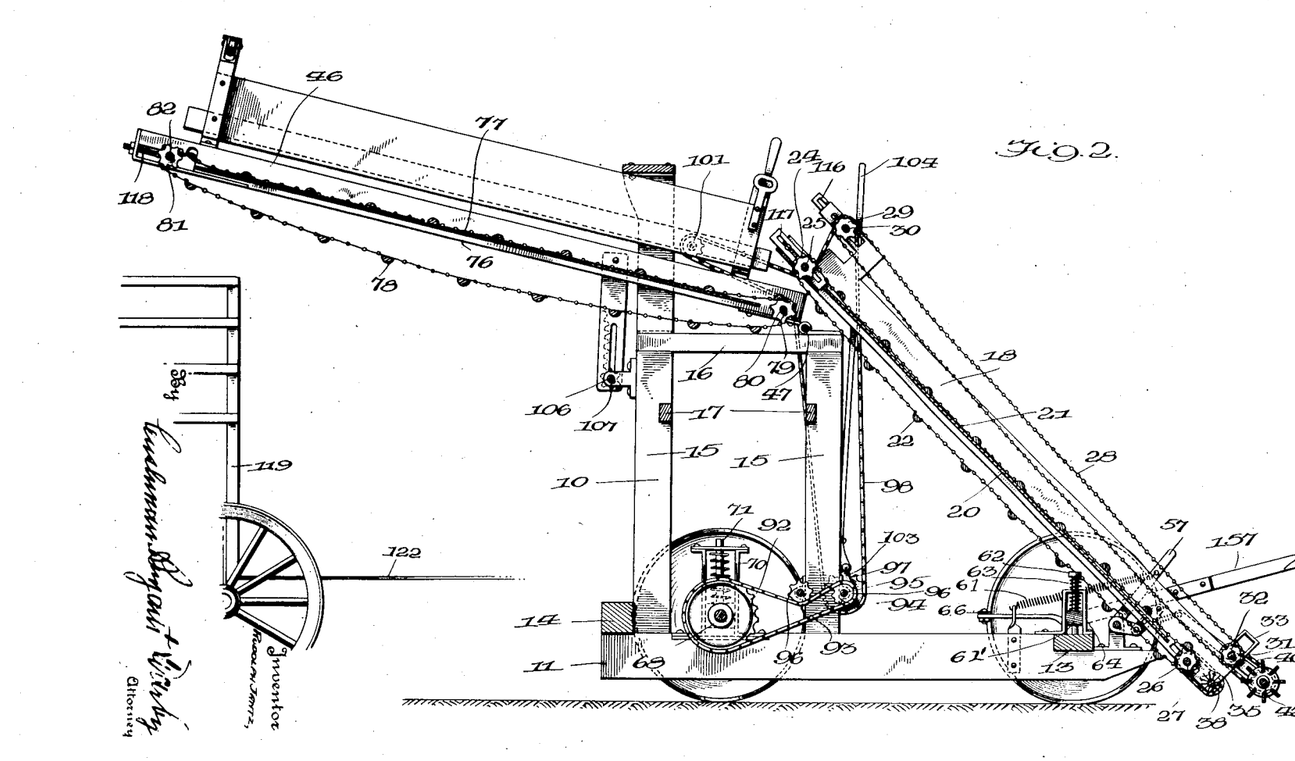
Figure 2 is a longitudinal central sectional view of the machine.
Figure 9:
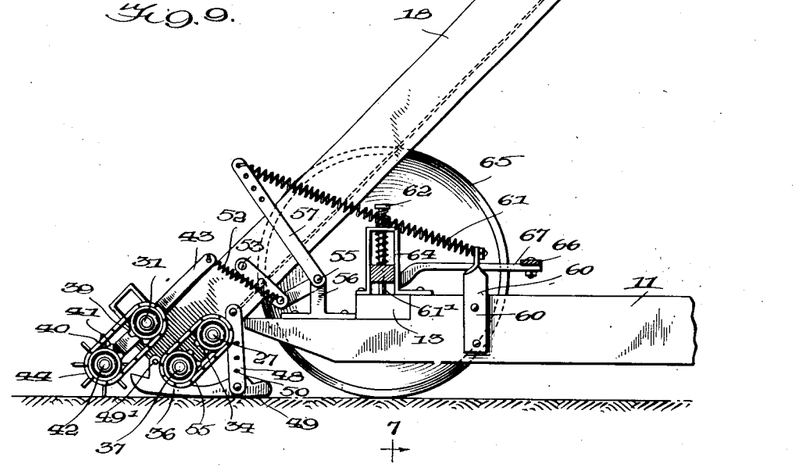
Figure 9 is a side view of the forward end of the machine taken on the same side as Figure 3 with one of the wheels removed.

An inclined elevator 18 is pivotally connected adjacent its upper end as at 19 to the frame 10, and is formed preferably with a closed bottom 20 around which is arranged to extend an endless conveyor 21 in the form of drive chains that are provided with transversely spaced carrying ribs or slats 22 (Fig. 2). The chains 21 at the upper end of the elevator engage pinions 24 keyed to the drive shaft 25, while the lower portion of the chains 21 engage the pinions 26 on the transverse shaft 27 that is carried by the lower extremity of the elevator 18. The elevator has also associated therewith a chain conveyor 28, spaced above the conveyor 20 and is preferably driven by the pinion 29 keyed to the shaft 30 at the upper end of the elevator. The lower portions of the conveyors 28 engage the pinions 31 carried by a shaft 32 vertically slidable in the guide bars 33 that are connected to the lower portion of the elevator. The shaft 27 to which the lower end of the conveyor chains are connected is also provided at one end with a pinion 34 (Fig. 9) which is connected by a chain 35 to a pinion 36 keyed to a shaft 37, on which is mounted a series of radial flexible bristles 38 that constitute the lower pickup drum. The shaft 31 which drives the upper conveyor 28 is similarly provided with a pinion 39 which is connected by a chain 40 to a pinion 41 carried by a shaft 42, which shaft is supported by the arms 43 pivotally mounted at 43' to the shaft 31. A pickup drum 44 preferably in the form of transverse extending blades 45 is secured to the shaft 42 so as to be simultaneously driven with the lower pickup drum 38. These drums are sufficiently spaced apart to cause the material to be collected and delivered between the upper and lower conveyors to the elevator from where it is conducted and emptied onto a carrier 46 pivotally connected as at 47 to the frame 10.

The lower end of the inclined elevator 18, has connected thereto by the links 48, a pair of skid shoes 49, each of which at their forward extremity, is secured as at 49' to the lower end of the elevator. These shoes preferably are adjustably connected to the elevator in any suitable manner, such as by providing the links 48 with vertical openings 50 that are arranged to fit in lugs 51 carried by the elevator. The free ends of each of the arms 43 are connected to the elevator 18 by the spring 52 so as to yieldably maintain the upper pickup drum 44 in position.

The lower end of the upper conveyor 28 and the pickup drum 44 are vertically movable in the guide bars 33 so that if an unusually large bulk of material be delivered between the conveyors to the elevator, it will not render the device inoperative, but will cause the upper pickup drum, and the upper conveyor to be moved in the guide bars to increase the opening between the upper and lower conveyors and permit the material to be fed to the machine.

Figure 1:
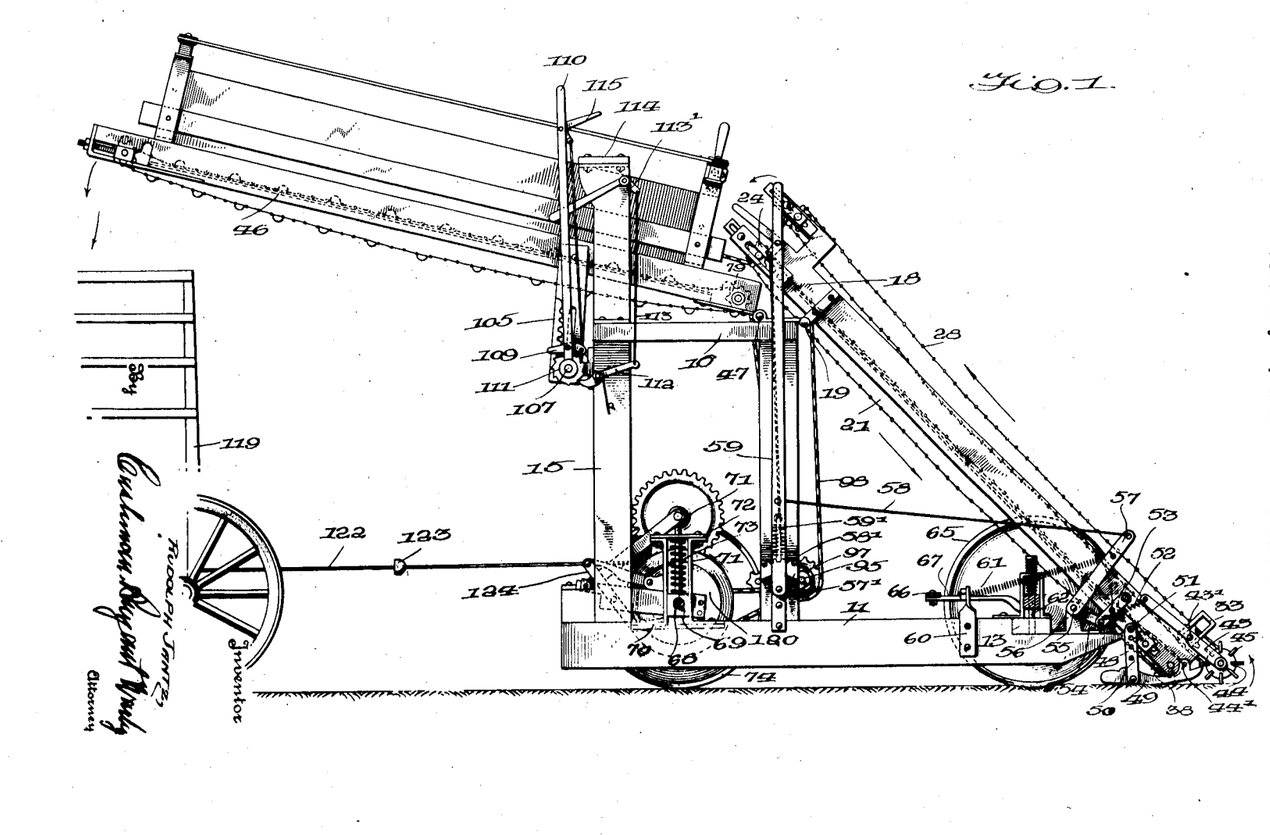
Figure 1 is a side elevation of the machine showing a portion of a wagon or other receiving receptacle towed thereby.

The lower end of the elevator 18 is connected by the links 53 to arms 54 keyed to a transverse shaft 55, that is mounted on the studs 56, secured to the lower member 11 of the frame. To each end of the shaft 55 is keyed an upwardly projecting arm 57, one of which is connected by the rod 58 to an operating lever 59, that has a plunger 59' arranged to fit in the notches 58' formed in the segmental bracket 57' for locking the lever 59 in different positions. The lower members 11 are preferably provided with brackets 60 to each of which is secured at one end, a spring 61 that is connected at its opposite extremity to the adjacent arm 57. It will be seen that upon the actuation of the rod 58 to the left, as shown in Figure 1, the lower portion of the elevator and its associated parts will be raised so that the same may pass over any obstructions in the path of the machine.

Figure 3:
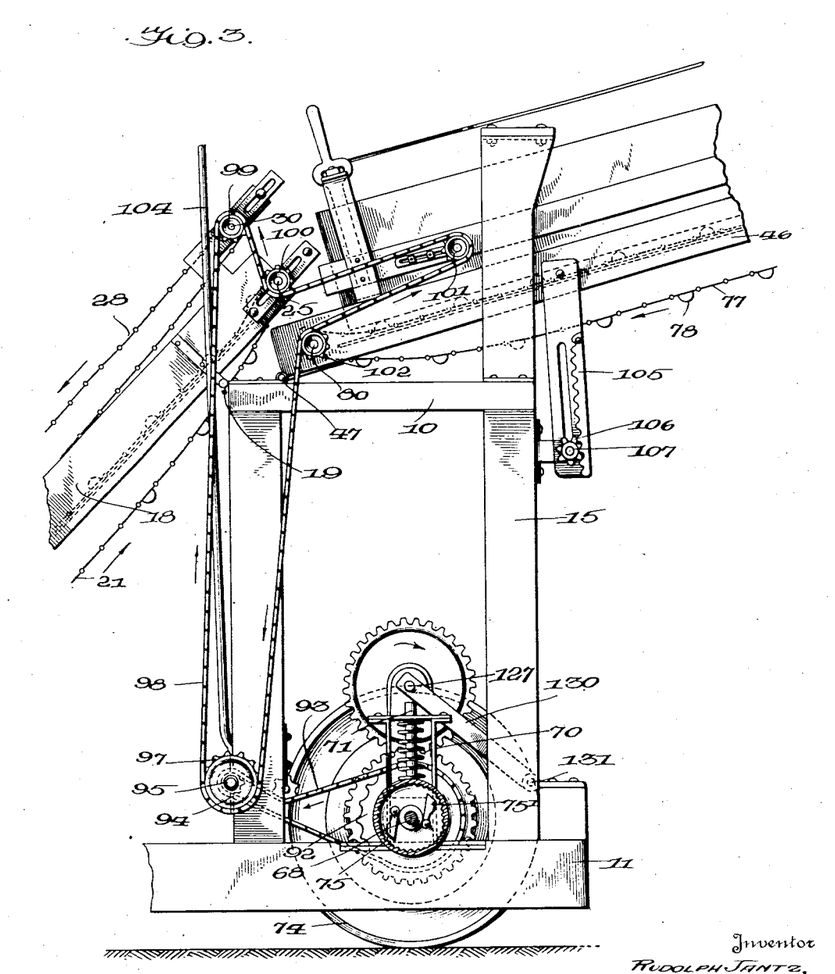
Figure 3 is a fragmentary side view of the machine shown in Figure 1, with one of the rear wheels in section.

The supporting frame 10 has mounted thereon the front axle 61' which is centrally connected to the transverse bar 13 by a king bolt 62, between the head of which and the axle is confined a tension spring 63. The ends of the axle are loosely guided in the U-shaped arms 64, mounted on the skids 11, so that the body of the machine will remain in a substantially horizontal position when the wheels and front axle are inclined as is the case in travelling over uneven ground. To the ends of the axle 61' are journalled the wheels 65 to the rear of which wheels may be connected a transverse spreader bar 66 by the arms 67. The rear axle 68 is carried by a slidable block 69 vertically movable in a housing 70 secured to the bottom members 11. The block 69 is provided with an upwardly projecting shank 71 which extends loosely through the top 72 of the housing while a spring 73 confined between the top 72 and the block 69 tends to yieldably maintain the axle in position. Journalled on the rear axle 68 are the wheels 74 each of which is provided interiorly with an annular serrated surface 75, (Fig. 3) which coacts with pawls 75' keyed to the rear axle so as to permit free movement of the wheels in one direction, but to cause them to be locked by the pawls to the axle 68 when revolved in an opposite direction.

The carrier 46 extends rearwardly from the frame in prolongation of the upper end of the elevator, and is preferably formed with a closed bottom 76, having extending longitudinally thereof, an endless chain conveyor 77 formed with spaced transverse slats or ribs 78. The chains 77 engage at their inner ends the pinions 79 of the drive shaft 80, and are connected at their outer ends to the gear tooth wheels 81 on the transverse shaft 82, that is mounted on the carrier 46.

Figures 4, 5:
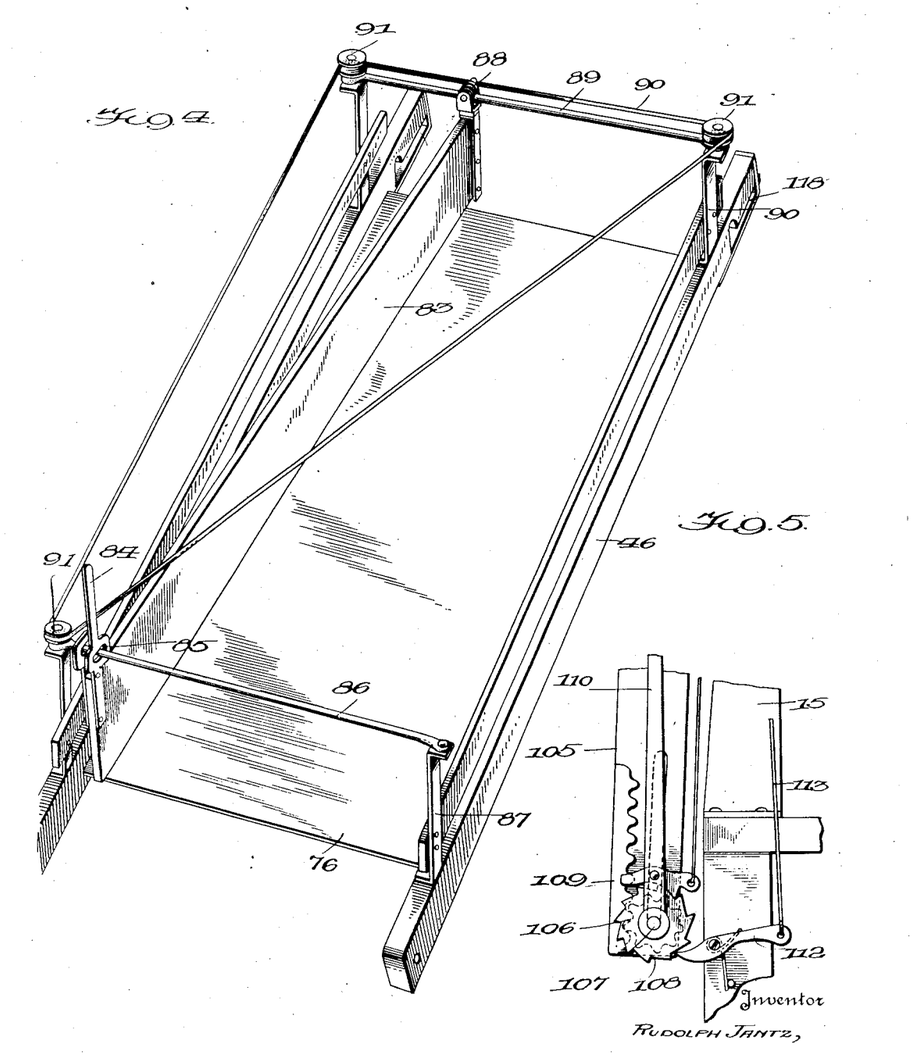
Figure 4 is a detailed perspective view of the carrier and the regulating board.
Figure 5 is a detailed view of the operating lever and its associated parts that actuates the carrier.

In order to control the direction of flow of the material as it is delivered to the carrier, a regulating board 83 (Fig. 4) is provided at one end with an upwardly projecting arm or lever 84 having an opening 85 through which loosely extends a transverse supporting bar 86 carried by the uprights 87, which uprights, are suitably connected to the carrier 46. The opposite end of the regulating board 83 has preferably mounted thereon a roller 88 which rides on a bar 89 carried by the arms 90 mounted on the adjacent end of the carrier. The inner end of the regulating bar may be adjusted by moving the lever 84 on the bar 86, while the outer end is preferably controlled by means of a cable 90, which has its ends connected to the roller 88 and engages the guide rollers 91 suitably positioned on the carrier so that upon the actuation of the cable 90, the outer end of the regulating board may be moved laterally to any desired position.

The rear axle 68 constitutes the main drive shaft of the machine, and has keyed thereon, a sprocket wheel 92 (Fig. 2) which is connected by an endless chain 93 to a pinion 94 keyed on a shaft 95 which shaft is journalled in a bearing on one of the upright members 15. The chain 93 preferably engages an idle gear 96 adjustably secured to the upright so as to maintain the chain in proper driving relation with the drive and driven shafts. The outer end of the shaft 95 has loosely mounted thereon a gear wheel 97 (Fig. 3) which is engaged by an endless drive chain 98 that passes over a pinion 99 secured to the shaft 30 of the upper conveyor 28, and then passes down to engagement with a pinion 100 on the shaft 25 of the lower conveyor and over an idle pinion 101 back and into engagement with a drive wheel 102 on the drive shaft 80 of the carrier conveyor 77. Thus it will be seen that upon the forward movement of the machine, the conveyors on the inclined elevator and carrier will be simultaneously actuated and at the same time the movement of the conveyors 20 and 28 on the inclined elevator will cause the actuation of the upper and lower pickup drums respectively. The shaft 95 has keyed thereon an axially slidable clutch 103 (Fig. 2) which is arranged to mesh with a complementary clutch on the adjacent face of the gear wheel 97 and actuated by a lever 104 so as to operatively connect the wheel 97 and drive chain 98 to the rear axle for moving the conveyors and pickup drums.

In order that the carrier 46 may be raised or lowered relative to the frame 10, it has connected to each side thereof a depending rack bar 105 that engages a complementary pinion 106 on a transverse shaft 107. One end of the shaft 107 is provided with a ratchet wheel 108 arranged to be engaged by a pawl 109 carried by an operating lever 110 that is pivoted at its lower end 111 to the shaft 107. The ratchet wheel 108 is maintained in locked position by a detent 112, that is connected by a rod 113 to a lever 113' on one of the upright members 15 and positioned adjacent the operator's seat 114. The pawl 109 is disengaged from the wheel 108 by a bell-crank 115, pivotally mounted on the lever 110. It will be seen that upon the actuation of the lever 110, the pinions 106 will cause the rack bar and carrier to be raised while the pawl 112 will tend to maintain the parts in locked position until being released by the actuation of the lever 113'. The operator's seat 114 is conveniently located adjacent the levers 59, 84, 110 and 113' so that the various movable parts may be readily controlled.

The shafts 24 and 30 which carry the pinions 25 and 29 are adjustably mounted in the slots 117 and 116 respectively, while the shaft 82 which supports the pinion 81 of the carrier 46 is adjustably maintained in position by means of threaded bolts 118 that extend through slots in the adjacent end of the corner, so that the conveyors may be maintained in proper driving relation at all times.

A suitable receptacle for receiving the material from the carrier, such as a wagon or slip 119 is connected to the machine so as to be towed thereby. In order that the material may be evenly and uniformly distributed in the wagon, means are provided for causing movement of the machine relative to the wagon, which comprises a winding drum 120 that is loosely mounted on the rear axle 68 and is connected to the wagon 119 in any suitable manner, preferably by a flexible cable 122 arranged to wind and unwind on the drum 120.

In order that the wagon may be periodically stopped or oscillated during the progress of the machine, the cable 122 has thereon two controlling dogs or beads 123, one of which is arranged on each side of a reverse actuating lever 124, the purpose of which will be subsequently described.

Figures 6, 7, 8:
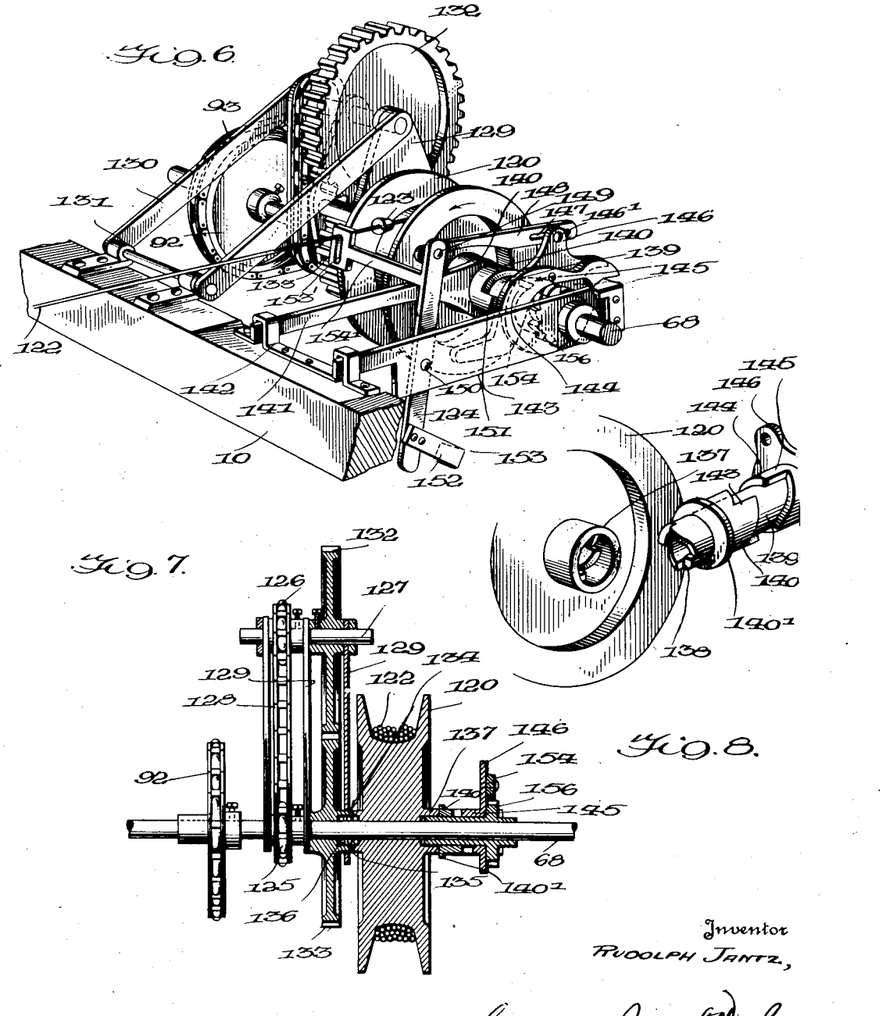
Figure 6 is a detailed perspective view of the drum actuating mechanism.
Figure 7 is a sectional view taken substantially along the line 7—7 of Figure 10.
Figure 8 is a disassembled detail of one side of the winding drum and its connection to the drive shaft.

In order that the drum 120 will rotate in a reverse direction to that of the rear axle 68, a gear mechanism is associated with the axle which mechanism essentially comprises a sprocket wheel 125 keyed to the rear axle (Fig. 7) and connected to a sprocket wheel 126 on a transverse shaft 127 by an endless chain 128. The shaft 127 is supported by the arms 129 pivoted on the rear axle, and the arms 130 movably connected as at 131 to the frame 10 (Fig. 6). A gear 132 on the shaft 127 meshes with a complementary gear 133 loosely mounted on the rear axle 68 said gear 133 having a clutch face 134 arranged to engage a complementary clutch surface 135 formed on the adjacent side of the drum 120 in order to reverse or unwind the drum when the latter is connected to the gear 133. A spring 136 normally tends to force the clutch 134 out of engagement with the clutch 135. The opposite side or face of the drum 120 (Fig. 8) is similarly formed with a clutch face 137 which detachably engages a clutch 138 on a sleeve 139 keyed to the rear axle, so that when the drum is engaged with this sleeve, it will rotate in the same direction as the rear axle 68. An axially slidable member 140 is mounted on the sleeve 139 and is provided with a rearwardly extending arm 141 which is loosely mounted in the guide 142 on the frame 10. The member 140 has an annular collar 140' that abuts the adjacent face of the drum on one side and has its opposite face formed with a clutch surface 143 which coacts with a similarly formed surface 144 on a bushing 145 rotatably mounted on the sleeve 139. The bushing 145 is further provided with an integral lug 146 which carries a pin 146' that is slidable in a slot 147 formed in a link 148 which link is pivotally connected at 149 to the upper end of the reversing lever 124. The lever 124 is pivotally connected between its ends as at 150 to an arm 151 that has one end secured to the rear axle 68 and its opposite extremity held in position by the guide 142 (Fig. 6). The lower end of the lever 124 has projecting outwardly thereof a lug 152 having a laterally extending hook portion 153 arranged when the lever is thrown rearwardly by the link 148 to engage the depending arm 154 of a pawl 155 (Fig. 10) carried by the lug 146 of the bushing 145. When the lower end of the lever 124 is moved rearwardly, that is to the position shown in Figure 6, the lug 152 acts as a tripping mechanism for forcing the pawl 155 into engagement with a ratchet wheel 156 keyed to the rear axle 68 which tends to force the slidable member 140 into locking engagement with the drum 120 which in turn is urged into locking engagement with the gear wheel 133 against the action of the spring 136. Likewise when the bushing 145 is actuated by the lever 124 so as to complete the disengagement of the pawl 155 from the ratchet wheel 156 the drum 120 will be forced by the spring 136 to the right as shown in Figure 6, so as to bring the clutch 137 of the drum into interlocking engagement with the clutch 138 on the sleeve 139 which causes the drum to rotate in the same direction as the shaft 68.

Figure 10:
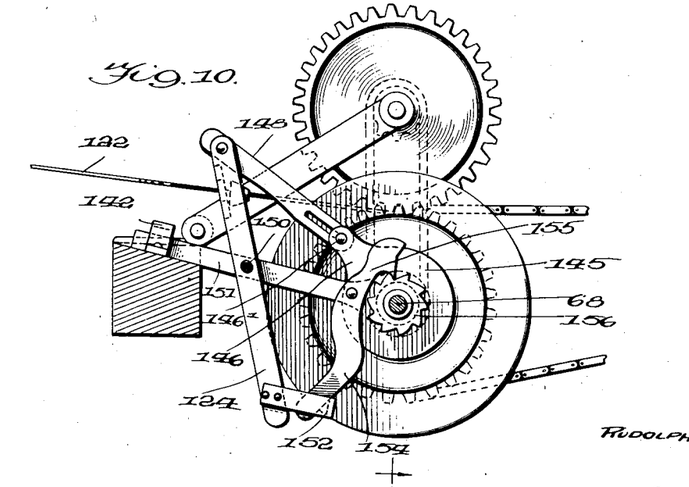
Figure 10 is a detail side view of the drive mechanism with parts in section.

Thus it will be seen that when the driving mechanism is in the position as shown in Figure 6, the drum 120 will be forced into locking engagement with the gear 113 so as to rotate in the opposite direction as the drive shaft 68 while when the parts are moved to the position shown in Figure 10 the drum 120 will be locked to the sleeve 139, thus revolving in the same direction to that of the axle.

The lever 124 has extending laterally from the upper portion thereof an arm 154' which is provided at its free end with a vertical opening 153' through which extends the cable 122 and on each side of which is positioned one of the dogs or beads 123 so that if the lever 124 is in the position as shown in Figure 6 the drum will continue to unwind due to its engagement with the gear wheel 133 until the dog 123 strikes the arm 154' which then causes the lever 124 to be thrown in the direction as shown in Figure 10, thus causing release of the drum 120 with the gear 133 and bringing the former into driving relation with the sleeve 139 so that the cable 122 will then wind up on the drum until the dog 123, as shown in Figure 1 strikes the arm 154' which causes a reversal of the operation.

The operation of the device is as follows:

Assuming the device to be propelled along the ground by any suitable means, such as by a tractor or horses that are connected to the draft bars 157, the operator first actuates the lever 59 so as to cause engagement of the endless chain 98 with the rear drive axle 68, thus bringing into operation the endless conveyors and pickup drums, so that the material is conducted between the drums to the elevator 20 and delivered to the carrier 46 which in turn conducts the material to the wagon 119. The lugs or beads 123 have been previously adjusted on the cable 122 so that the wagon may be drawn simultaneously with the machine and oscillate at periodic intervals in such a manner as to insure an even loading of the material therein. As shown in Fig. 1, the drum 120 has just completed its unwinding movement and the lever 124 has been moved so as to now cause the cable 122 to wind on the drum until the lug 123 hits the arm 154', at which time the lever will be moved forward causing the dog 154 to engage the ratchet wheel 156 on the axle 68 which tends to take off the strain on the cable and assists the same to actuate the cam 140 so as to force the winding drum 120 into engagement with the gear wheel 133.

As soon as this is effected, the drum 120 will revolve in the opposite direction to that of the axle 68 causing the cable 122 to unwind until the other lug 123 strikes the arm 154', which then causes the lever 124 to be moved rearwardly, thus throwing the drum out of engagement with the gear wheel 133 and into engagement with the sleeve 139 so that the drum will revolve in the same direction as the shaft 68 to wind up the cable 122 which in turn causes the wagon 119 to be moved closer towards the machine and allow the material to be delivered to the rear end thereof.

The distance the stops 123 are spaced from each other will, of course, depends upon the length of the wagon and how close it can be brought to the loader. The carrier 46 extends a sufficient distance to the rear of the frame 10 so as to permit a proper loading of the wagon or other receptacle that receives the material.

As devices of this character have to travel over very rough and uneven surfaces the lower members 11 of the frame 10 are in the form of skids which may engage the ground while the front and rear axles are so constructed as to yieldably maintain the machine in proper operating position.

It will be noted that while the machine is progressing and the wagon is periodically oscillated and advanced closer to the frame 10 material is constantly being emptied by the carrier 46 on the wagon.

As the invention is capable of various modifications, it is to be understood that the form illustrated and disclosed, is merely illustrative of a preferred embodiment and that such changes as fall within the purview of one skilled in the art may be made without departing from the spirit of the invention and the scope of the appended claims.

What I claim is:

1. In combination, a loading device adapted to be propelled along the ground, a wagon towed by said device for receiving the material therefrom, a drive axle connected to said loading device, ground engaging wheels mounted on said axle, and means slidable on said axle and actuated by the movement of the loading device for periodically stopping the wagon.

2. In combination, a loading device adapted to be propelled along the ground, a wagon towed by said device, means conducting the material from said loading device to said wagon, a drive axle connected to said loading device, ground engaging wheels mounted on said axle, winding and unwinding means carried by said axle and operatively connected to said wagon, and means periodically stopping the wagon during the progress of the loading device to evenly distribute the material into the wagon.

3. In combination, a loading device comprising a frame, a carrier mounted on said frame, an elevator for conducting the material to said carrier, a receptable towed by said loading device and adapted to receive the material from said carrier, a drive axle extending transversely of said loading device, ground engaging wheels mounted on said axle, a drum axially slidable on said axle and operatively connected to said receptacle, and a common means on said axle for actuating the carrier, elevator and receptacle.

4. In combination, a loading device comprising a frame, a carrier mounted on said frame, an elevator for conducting the material to said carrier, said carrier and elevator provided with conveyors, a member towed by said loading device and adapted to receive the material from said carrier, a drive axle on said loading device, a drum slidably mounted on said axle and operatively connected to said receptacle, means causing movement of the loading device relative to said member, and means on said axle for actuating the conveyors and member.

5. In combination, a loading device comprising a frame, a carrier mounted on said frame, an elevator for conducting the material to said carrier, a member towed by said loading device and adapted to receive the material from the carrier, a drive axle connected to said loading device, a winding and unwinding drum slidably mounted on said axle, means for selectively causing the rotation of said drum in opposite directions and means on said axle operable by the forward movement of the loading device for periodically stopping said member during the forward movement of the loading device.

6. In combination, a loading device comprising a frame, a carrier mounted on said frame, an elevator for conducting the material to said carrier, a member towed by said loading device and adapted to receive the material from the carrier, a drive axle connected to said loading device, a slidable drum revolubly mounted on said axle, flexible means connecting said drum to said member, means for causing the drum to revolve in the same direction as said axle, and means for causing said drum to revolve in an opposite direction to said axle.

7. In combination, a loading machine having a drive axle, wheels mounted on said axle, a wagon, a drum slidable on said axle, a flexible member connecting the wagon to said drum, and means operated by said axle and associated with said flexible member for either winding or unwinding the drum.

8. In combination, a loading machine having a drive axle, wheels mounted on said axle, a wagon for receiving the material from said machine, a drum slidable on said axle, a cable connecting the wagon to the machine and arranged to be wound and unwound on said drum, a gear mechanism driven by said axle and adapted to be operatively connected to said drum for reversing the direction of rotation thereof, a sleeve secured to said axle and having means adapted to engage said drum for rotating the latter in the same direction as the axle, means for selectively bringing the drum into driving engagement with either the gear mechanism or the sleeve, and means on said cable co-acting with said last mentioned means for causing the machine to be moved relative to the wagon.

9. In combination, a loading machine having a drive axle, wheels on said axle, a wagon for receiving the material from said machine, a drum slidable on said axle, a cable connecting the wagon to the machine and arranged to be wound and unwound on said drum, a gear mechanism operatively connected to said axle and said drum for unwinding the drum, means normally tending to urge the drum out of engagement with the gear mechanism, a sleeve secured to said axle and adapted to engage the drum when the latter is disengaged from the gear mechanism, a slidable member on said sleeve and abutting said drum, a bushing on said sleeve adjacent said slidable member, said sleeve and bushing having opposed cam surfaces adapted to move the sleeve and drum axially on the axle, a lever connected to said bushing for actuating the same, said lever having an arm with an opening through which the cable extends, said cable having a bead secured thereto on each side of said arm and adapted when brought into engagement therewith to operate the lever so as to either wind or unwind the drum.

10. In combination, a loading device adapted to be propelled along the ground, a wagon connected to said device, for receiving the material therefrom, a drive axle extending transversely of the loading device, ground engaging wheels mounted on said axle, a winding and unwinding drum operatively connected to said axle and said wagon, and means periodically winding and unwinding the drum during the forward movement of the loading device.

In testimony whereof I have hereunto set my hand.

RUDOLPH JANTZ.